US012100569B2

(12) United States Patent
Schaffner et al.

(10) Patent No.: US 12,100,569 B2
(45) Date of Patent: Sep. 24, 2024

(54) PUSH-IN FUSE HOLDER

(71) Applicant: Regal Beloit America, Inc., Beloit, WI (US)

(72) Inventors: Luke D. Schaffner, Findlay, OH (US); Joseph A. Brown, Waterville, OH (US); Paul S. Buskey, Whitehouse, OH (US); Robert Scheckelhoff, Perrysburg, OH (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 17/878,502

(22) Filed: Aug. 1, 2022

(65) Prior Publication Data

US 2024/0038475 A1 Feb. 1, 2024

(51) Int. Cl.
*H01H 85/22* (2006.01)
*H01H 85/20* (2006.01)

(52) U.S. Cl.
CPC ...... *H01H 85/2045* (2013.01); *H01H 85/205* (2013.01); *H01H 85/22* (2013.01)

(58) Field of Classification Search
CPC .......... H01H 85/22; H01H 85/2045–2085/209
See application file for complete search history.

(56) References Cited

U.S. PATENT DOCUMENTS 2,321,271 A * 6/1943 Bahlke .................. H01H 85/32 337/241
2003/0201866 A1* 10/2003 Sudan ................ H01H 85/0091 337/187
2008/0184560 A1* 8/2008 Pizzi ...................... H01H 85/56 29/874
2012/0068808 A1* 3/2012 Darr ....................... H01H 21/16 337/201
2013/0023156 A1* 1/2013 von zur Muehlen .. H01H 85/24 439/620.26

(Continued)

OTHER PUBLICATIONS

Product Data Sheet for Push-In Terminal Blocks, Elmex Controls Pvt. Ltd., Gujarat, India; 8 pp.

(Continued)

*Primary Examiner* — Jacob R Crum
(74) *Attorney, Agent, or Firm* — Armstrong Teasdale LLP

(57) ABSTRACT

A fuse holder is disclosed. The fuse holder includes a housing having a fuse compartment and termination compartments, each termination compartment having a cable termination aperture for receiving a cable and a lock pin slot; a bus assembly disposed including current bars having a first end and a second end extending from the termination compartment to the termination compartment, the first end having fuse contacts extending from the first end, the second end including a barb extending from the second end; and, push-in clamps disposed within the termination compartment, the push-in clamps normally biased against the barbs; wherein insertion of an electrical cable into the cable termination aperture depresses and elastically deforms the push-in clamp such that a gap is formed between the barb and the push-in clamp, wherein the push-in clamp continuously applies a biasing force against the electrical cable non-removably clamping the cable into the termination aperture.

17 Claims, 6 Drawing Sheets

(56) References Cited

U.S. PATENT DOCUMENTS

| | | | | |
|---|---|---|---|---|
| 2013/0187747 | A1* | 7/2013 | Reibke | H01H 85/545<br>337/213 |
| 2014/0273640 | A1* | 9/2014 | Brakefield | H01H 85/22<br>439/620.29 |
| 2017/0365437 | A1* | 12/2017 | Brakefield | H01H 71/122 |
| 2022/0416449 | A1* | 12/2022 | Fehling | H01R 4/4836 |

OTHER PUBLICATIONS

Product Data Sheet for KUFH 4 Wire Termination Technology Screw Clamp, Elmex Controls Pvt. Ltd., Gujarat, India; 5 pp.

* cited by examiner

PUSH-IN FUSE HOLDER

FIELD

The present disclosure relates to power distribution fuse holders and, in particular, the present disclosure relates to push-in fuse holders having self-clamping electrical cable connectors.

BACKGROUND

Fuses in power distribution applications commonly include a pair of opposing electrical contacts and a filament connecting the opposing electrical contacts. The filament is rated for a particular amperage, and if the current conducting through the electrical circuit downstream from the fuse exceeds the fuse rating—either due to a short circuit or a circuit overload—the filament is configured to melt, break, or otherwise disconnect, thereby breaking the electrical connection between the opposing electrical contacts. Unlike circuit breakers which can be reset, a "blown" fuse must be replaced. Fuses are placed within a fuse socket of a disconnect switch, or in the instance of power distribution panels, in a fuse holder or cradle.

Power distribution fuse panels include a single phase or multi-phase main power feed subdivided into branch circuits. Each branch circuit includes a fuse holder protecting each branch circuit from short circuits and power overloads. The fuse holder is secured to a busbar assembly of the power distributing panel, and a phase of the main power feed is connected to the fuse holder. Branch circuit cables are then terminated onto electrical cable connectors. A technician, either at the factory or in the field, must individually secure each fuse holder to the busbar assembly of the power distribution panel, connect the phases of the main power feed to the fuse holder and terminate the branch circuit cables to each fuse holder. For larger power distribution panels having forty or more branch circuits, this process can be laborious and time consuming.

Therefore, there exists a need in the art to improve installation and cable connection of fuse holders and reduce assembly times.

BRIEF DESCRIPTION

In one aspect, a fuse holder is disclosed. The fuse holder includes a housing including sidewalls and compartment walls defining a fuse compartment and termination compartments, each termination compartment having a cable termination aperture for receiving an electrical cable and a lock pin slot, the fuse compartment configured to receive a fuse; a bus assembly disposed including current bars having a first end and a second end extending from the termination compartment to the termination compartment, the first end having fuse contacts extending from the first end, the second end including a barb extending from the second end; and push-in clamps disposed within the termination compartment, the push-in clamps normally biased against the barbs, the push-in clamp configured to elastically deform, upon insertion of the electrical cable into the cable termination aperture, to form a gap between the barb and the push-in clamp, the push-in clamp further configured to continuously apply a biasing force against the electrical cable clamping the cable into the termination aperture.

In another aspect, a fuse holder is disclosed. The fuse holder includes a housing including sidewalls and compartment walls defining a fuse compartment and termination compartments, each termination compartment having a cable termination aperture for receiving an electrical cable and a lock pin slot, the fuse compartment configured to receive a fuse; a bus assembly disposed including current bars having a first end and a second end extending from the termination compartment to the termination compartment, the first end having fuse contacts extending from the first end, the second end including a barb extending from the second end; push-in clamps disposed within the termination compartment, the push-in clamps normally biased against the barbs, the push-in clamp configured to elastically deform, upon insertion of the electrical cable into the cable termination aperture, to form a gap between the barb and the push-in clamp, the push-in clamp further configured to continuously apply a biasing force against the electrical cable clamping the cable into the termination aperture, wherein withdrawing of the electrical cable from the cable termination apertures causes the barbs to catch the electrical cable due to the biasing force applied by the push-in clamp against the electrical cable; and lock pins positioned within the lock pin slots, the lock pins normally abutting the push-in clamps, wherein the lock pin slots are positioned adjacent to the cable termination apertures, wherein depression of the lock pins depresses the push-in clamps such that the push-in clamps no longer biases the electrical cable.

BRIEF DESCRIPTION OF THE DRAWINGS

The reference symbols used in the drawings, and their meanings, are listed in summary form in the list of reference symbols. In principle, identical parts are provided with the same reference symbols in the figures.

DETAILED DESCRIPTION

In the following specification and the claims, reference will be made to a number of terms defined to have the following meanings.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not.

As used herein, the term "panelboard" refers to an electrical enclosure that houses electrical disconnect switches, (such as fused switches or fuse holders). The panelboard includes a busbar assembly to carry electrical current from an external, main power source to downstream switches. The busbar assembly includes separate copper or aluminum laminations for each phase and additional laminations for a neutral to form an electrical circuit. Opening and closing of the phases is controlled by a main electrical disconnect switch (referred to herein as a "main") which has a line-side connection to the upstream external power source (such as a service entrance connection) and a load-side connection to downstream electrical disconnect switches (referred to herein as "branch switches") or fuse holders (also referred to herein as "fuse cradles") positioned within the panelboard enclosure. Branch switches downstream from the main can provide power to electrical equipment and components of an electrical system or circuit connected to the branch switches by way of cable conduit extending from the panelboard enclosure. As used herein, the term "line-side connection" shall refer to an upstream connection of the element or component and "load-side connection" shall refer to a downstream connection of the element or component.

Figure 1:
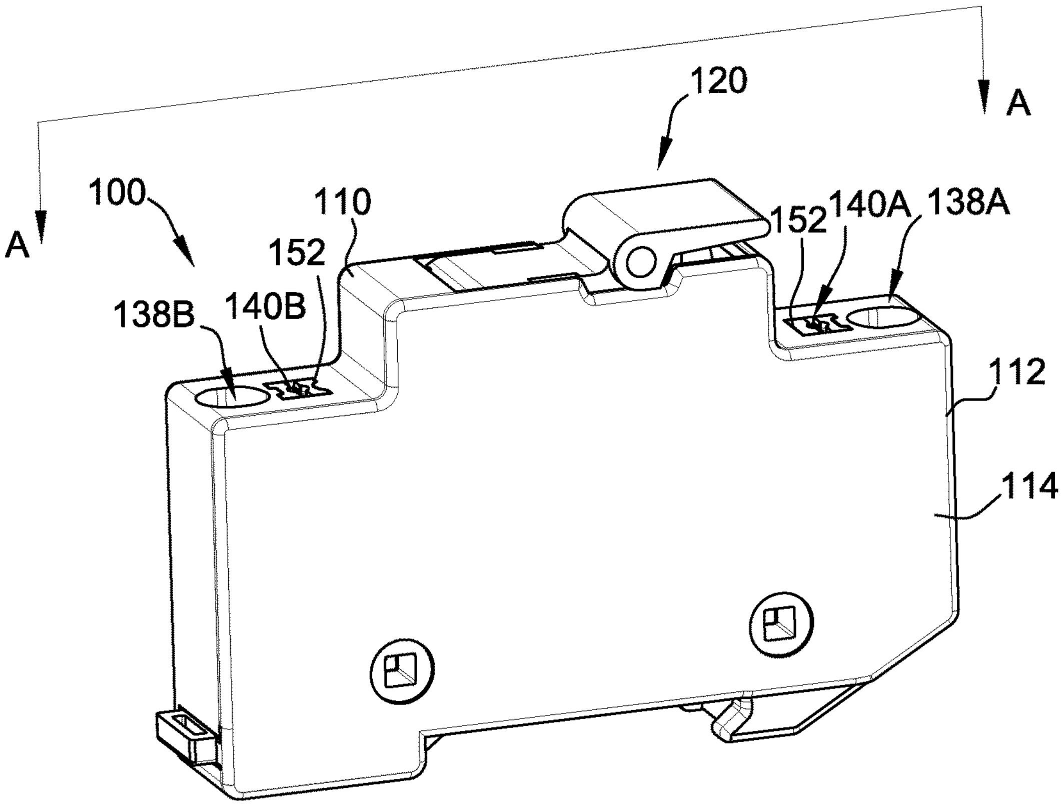
FIG. 1 illustrates a perspective view of a fuse holder in accordance with one or more embodiments of the present disclosure.
Figure 2:
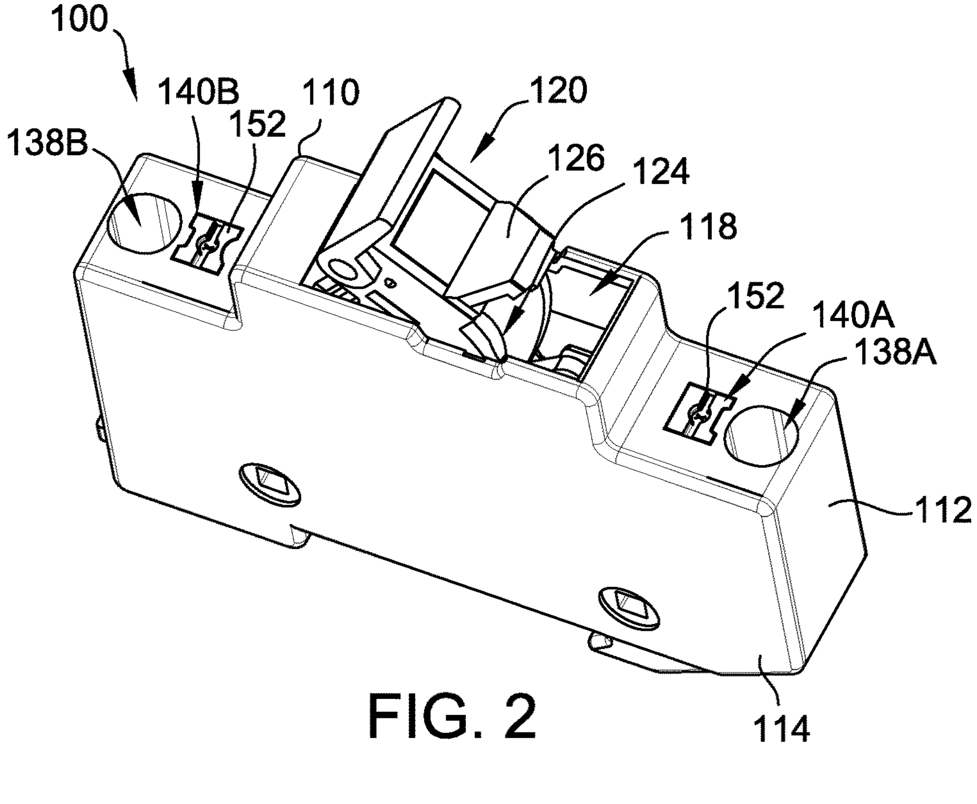
FIG. 2 illustrates a top perspective view of the fuse holder 100.

FIG. 1 illustrates a perspective view of a fuse holder 100 in accordance with one or more embodiments of the present disclosure. FIG. 2 illustrates a top perspective view of the fuse holder 100. The fuse holder 100 includes a housing 110 having sidewalls 112 extending from the housing 110, and a side plate 114 attached to the sidewalls 112. As explained in further detail below with reference to FIGS. 5 and 6, the housing 110 includes internal walls 130 which secure a bus assembly 150 (as shown in FIG. 7) to the housing 110. In some embodiments, the housing 110 is injected molded or machined, and the side plate 114 can be removably or non-removably secured to the sidewalls 112. In some embodiments, the side plate 114 is snap-fit onto the housing 110. In some embodiments, the side plate 114 is friction-fit or press-fit onto the housing 110. In some embodiments, the side plate 114 is welded onto the housing 110. In some embodiments, the side plate 114 is fastened onto the housing 110. The sidewalls 112 further includes a fuse opening 118 for inserting a fuse into a fuse lever 120

Figure 3:
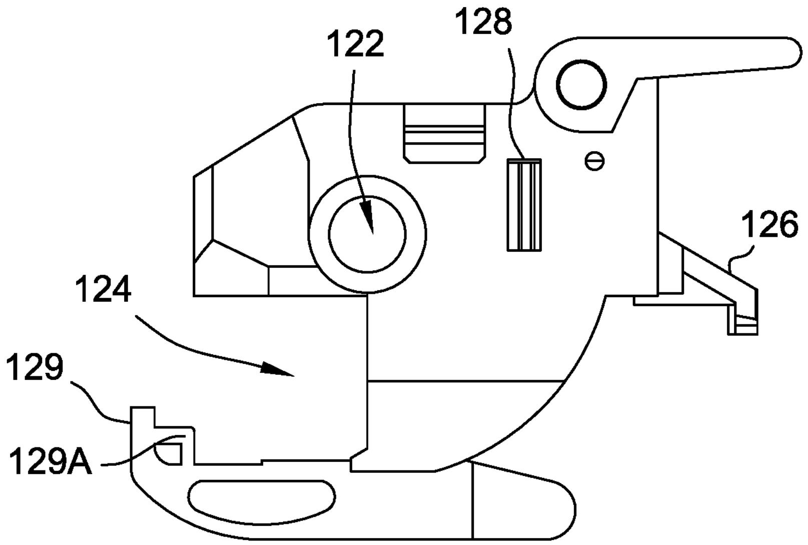
FIG. 3 illustrates a side view of a fuse lever of the fuse holder of FIG. 1.
Figure 4:
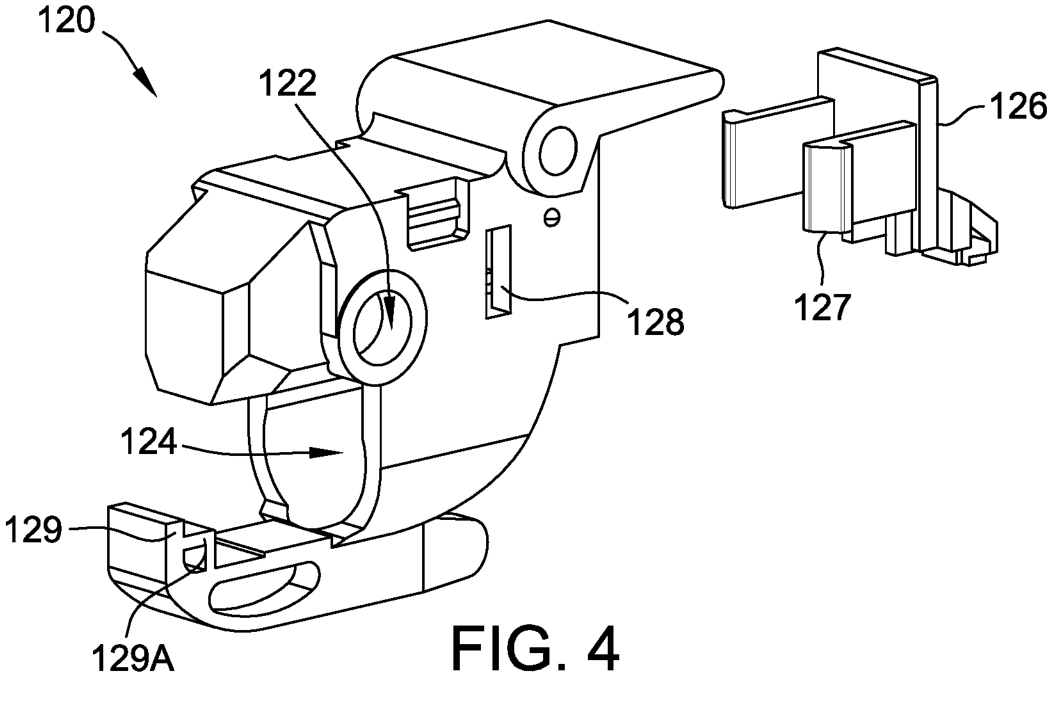
FIG. 4 illustrates an exploded side view of the fuse lever of FIG. 3.

With reference to FIGS. 3 and 4, the fuse holder 100 further includes a fuse lever 120 for holding a fuse (not shown). FIG. 3 illustrates a side view of the fuse lever 120 and FIG. 4 illustrates an exploded side view of the fuse lever 120. The fuse lever 120 is positioned within the fuse opening 118 (of FIG. 2) and includes an aperture 122 which interdigitates with pins 116 extending from the housing 110 and from the side plate 114 such that the fuse lever 120 can pivot about the pins 116. In some embodiments, the fuse lever 120 can pivot 70 degrees about the pins 116. The fuse holder 120 further includes a slot 124 for receiving the fuse and a snap-fit cap 126 for securing the fuse within the slot 124. The snap-fit cap 124 in some embodiments includes cantilevered prongs 127 which are configured to elastically deform and interdigitate with corresponding openings 128 of the fuse lever 120. In operation, a fuse is inserted into the slot 124 and a user can then insert the snap-fit cap 124 into the fuse lever 120 until the cantilevered prongs 127 interdigitate with the corresponding openings 128 and the snap-fit cap 124 removably locks onto the fuse lever 120. The fuse lever 120 further includes an end-stop 129 opposite the snap-fit cap 124 which limits the distance the fuse can be inserted into the slot 124. The end-stop 129 is sized and configured to limit the size of the fuse being inserted into the slot 124. In some embodiments, the end-stop 129 further includes a ledge 129*a* extending a distance from the end-stop 129 which is sized and configured to fit with UL Class CC fuses; which include a stepped electrical contact. Thus, in some embodiments, the end-stop 129 is configured to accept midget-type fuses, and in some embodiments, the ledge 129*a* is configured to accept UL Class CC fuses.

Figure 5:
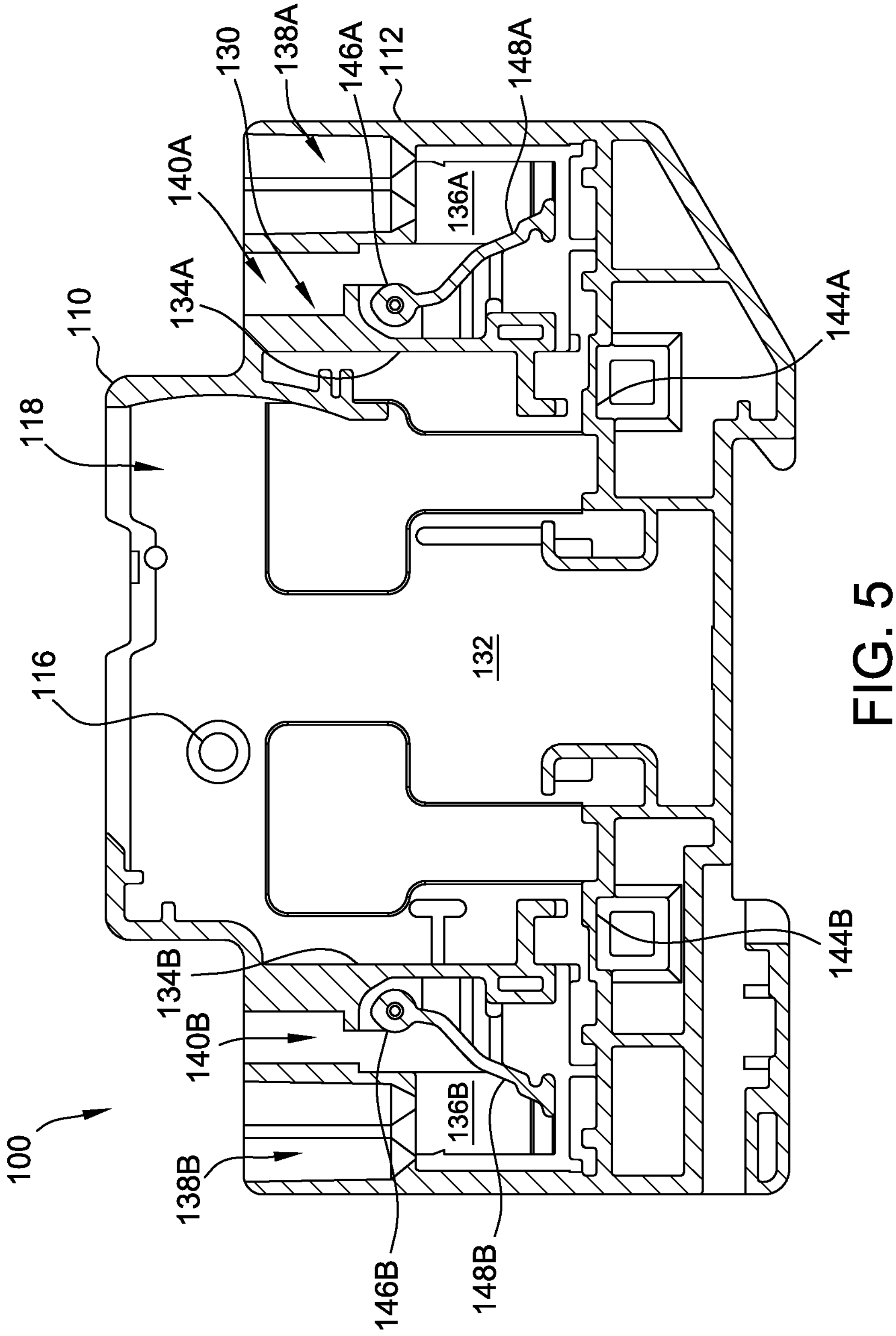
FIG. 5 illustrates a cross-sectional view of the fuse holder of FIG. 1 taken along line A-A'.
Figure 6:
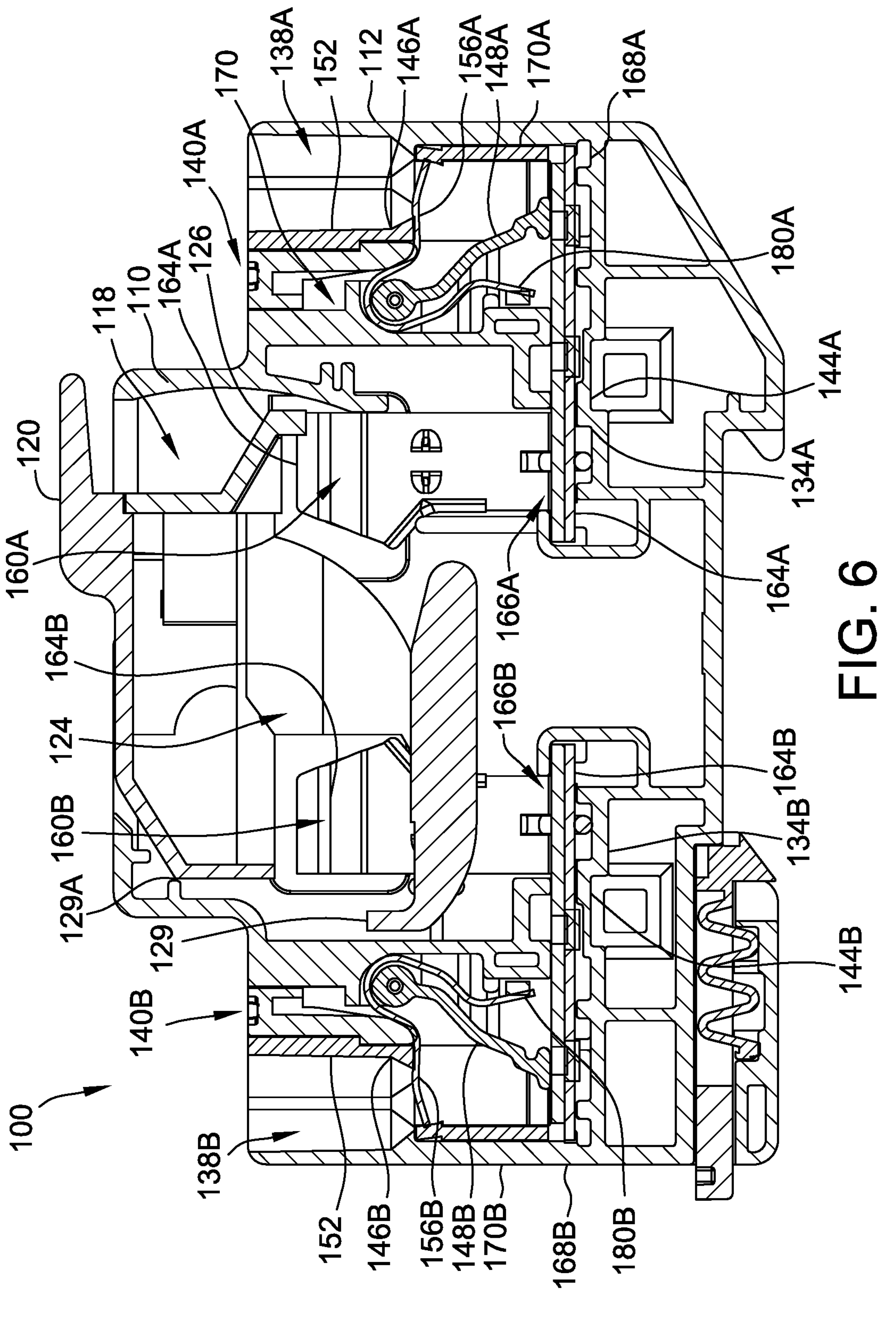
FIG. 6 illustrates a cross-sectional view of the fuse holder of FIG. 1 taken along line A-A' with a bus assembly positioned within the housing.
Figure 7:
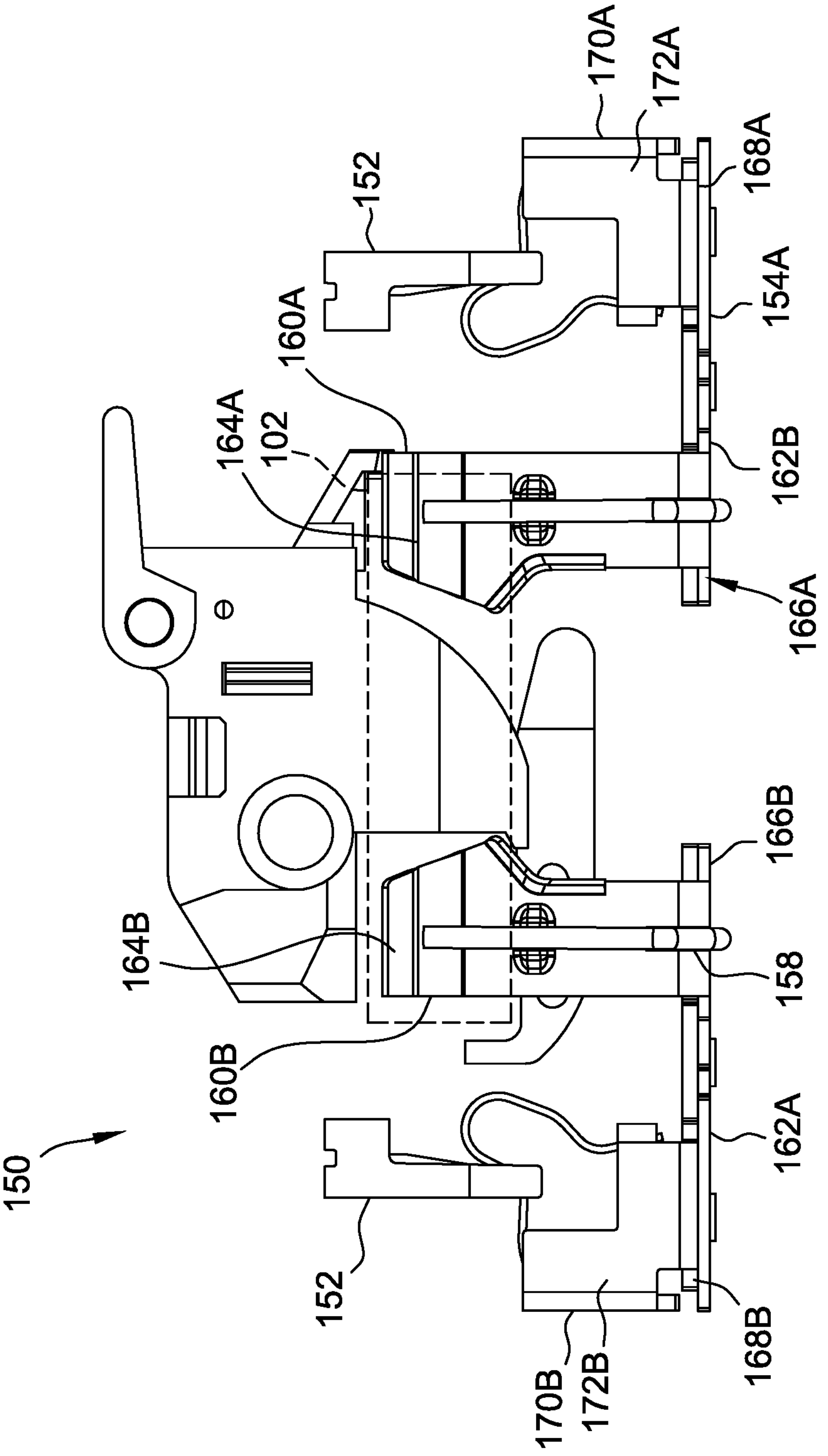
FIG. 7 illustrates a side view of a bus assembly of the fuse holder of FIG. 1.
Figure 8:
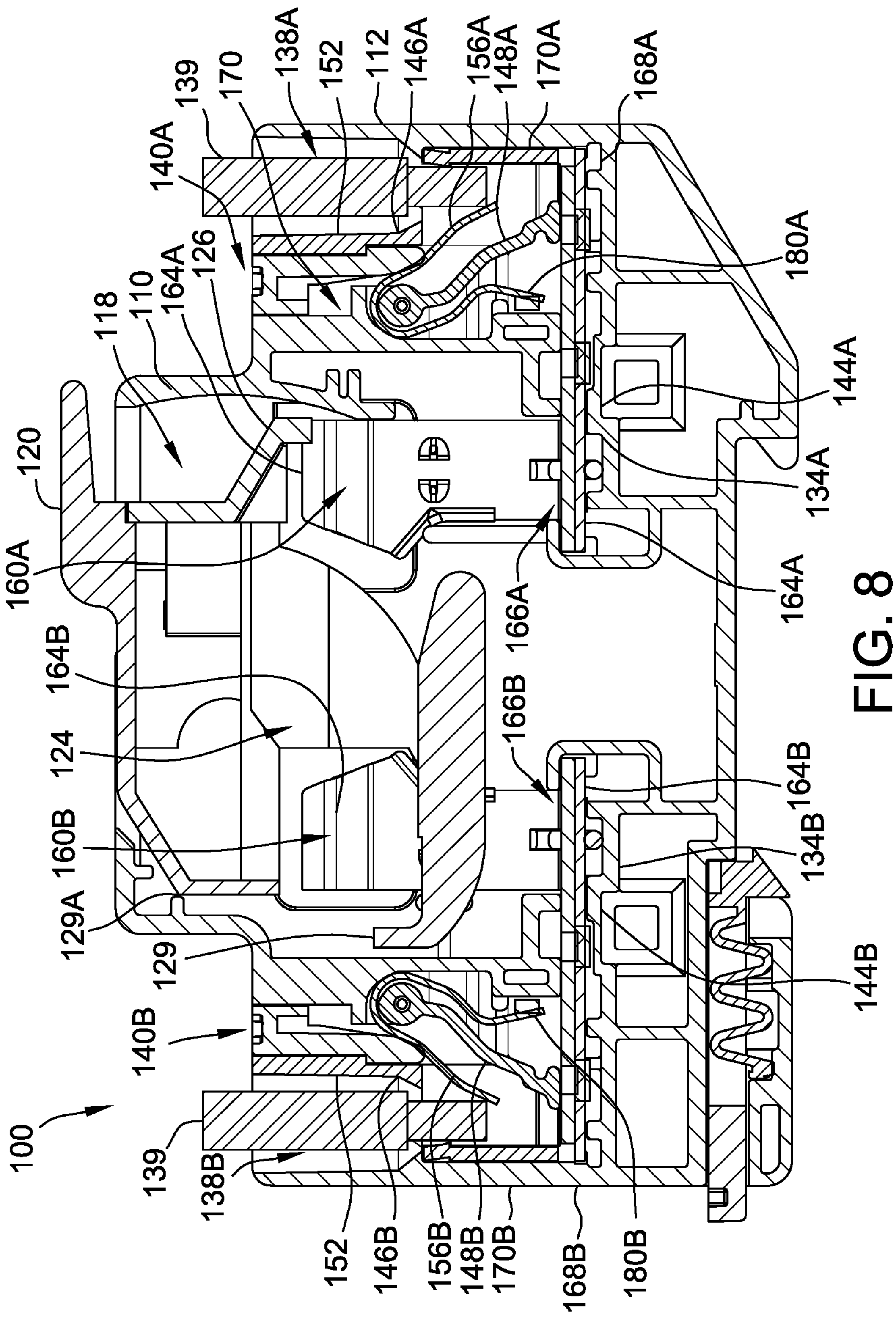
FIG. 8 illustrates a cross-sectional view of the fuse holder of FIG. 1 taken along line A-A' with an electrical cable positioned within the housing.

With reference to FIGS. 5, 6, and 8, the interior walls 130 of the housing 110 are described. FIG. 5 illustrates a cross-sectional view of the housing 110 of FIG. 1 taken along line A-A' and FIG. 6 illustrates a cross-sectional view of the housing 110 taken along line A-A' with the bus assembly 150 positioned within the housing 110. FIG. 8 illustrates a cross-sectional view of the housing 110 of FIG. 1 taken along line A-A' with an electrical cable 139 positioned within the housing 110. As shown in FIG. 5, the housing 110 includes a fuse compartment 132 defined by compartment walls 134*a* and 134*b*. The fuse compartment 132 includes the pins 116 and the fuse compartment 132 is configured to receive the fuse lever 120 and the fuse. A first termination compartment 136*a* is defined by the compartment wall 134*a* and the sidewalls 112. Likewise, a second termination compartment 136 *b* is defined by the compartment wall 134*b* and the sidewalls 112. Each termination compartment (136*a*, 136*b*) includes a cable termination aperture 138*a* and 138*b* extending through the sidewall 112 and a lock pin slot 140*a* and 140*b* extending through the sidewall 112. In some embodiments, the lock pin slots (140*a*, 140*b*) are positioned adjacent to the cable termination apertures (138*a*, 138*b*). The cable termination apertures (138*a*, 138*b*) are configured to receive the electrical cable (139) and, in some embodiments, the lock pin slots (140*a*, 140*b*) are configured to receive a lock pin 152 as shown in FIGS. 6-8, and as explained in further detail below.

Each termination compartment (136*a*, 136*b*) further includes a channel (142*a*, 142*b*) defined by an opening in the compartment walls (134*a*, 134*b*), and a support wall (144*a*, 144*b*) perpendicular to the compartment walls (134*a*, 134*b*). The opening is between the compartment walls (134*a*, 134*b*) and support walls (144*a*, 144*b*) and the channel (142*a*, 142*b*) extend between the fuse compartment 132 and the compartment walls (134*a*, 134*b*). As explained in further detail below with reference to FIGS. 6 and 7, a current bar (162*a*, 162*b*) is positioned in the channels (142*a*, 142*b*).

Each termination compartment (136*a*, 136*b*) further includes a clamp support protrusion (146*a*, 146*b*) and a clamp support wall (148*a*, 148*b*) extending to the channel (142*a*, 142*b*). As explained in further detail below, the clamp support protrusion (146*a*, 146*b*) and the clamp support wall (148*a*, 148*b*) are configured to secure a push-in clamp (156*a*, 156*b*) of each termination compartment (136*a*, 136*b*).

With reference to FIGS. 5 through 7, the bus assembly 150 is positioned within each termination compartment (136*a*, 136*b*), and partially into the fuse compartment 132. FIG. 6 illustrates the bus assembly 150 positioned within the housing 110 and FIG. 7 illustrates the bus assembly 150. As shown in FIGS. 6 and 7, the bus assembly 150 includes fuse contacts (160*a*, 160*b*) positioned within the fuse compartment 132, a current bar (162*a*, 162*b*) extending from the fuse compartment 132 into each of the termination compartments (136*a*, 136*b*), and the push-in clamp (156*a*, 156*b*). In some embodiments, each of the fuse contacts (160*a*. 160*b*) and the current bars (162*a*, 162*b*) are copper or aluminum. In some embodiments, the push-in clamp (156*a*, 156*b*) is copper, aluminum, steel, spring steel or a deformable resin such as polyester, ABS, nylon, acetal, and polyphenylene sulfide.

Each fuse contact (160*a*, 160*b*) is electrically connected to each respective current bar (162*a*, 162*b*), but the fuse contacts (160*a*, 160*b*) are not electrically connected to one another. When a fuse is not installed into the fuse lever 120, or when the fuse lever 120 is open or removed from the fuse compartment 132 (as shown in FIG. 1), the circuit is open, electrical current does not pass between the fuse contacts (160*a*, 160*b*). When a fuse (illustrated as a dashed-element 102 in FIG. 7) is installed into the fuse lever 120 and the fuse lever 120 is closed (as illustrated in FIG. 7), electrical current passes from one of the fuse contacts (160*a*, 160*b*), through the fuse 102 to the other of the fuse contacts (160*a*, 160*b*), closing the circuit.

The current bars (162*a*, 162*b*) are positioned between and supported by support walls (144*a*, 144*b*) and the compartment walls (134*a*, 134*b*). In some embodiments, the current bars (162*a*, 162*b*) are also supported by the clamp support walls (148*a*, 148*b*). A first end (166*a*, 166*b*) of the current bars (162*a*, 162*b*) contact to or are integral to the fuse contacts (160*a*, 160*b*). A second end (168*a*, 168*b*) of the current bars (162*a*, 162*b*) include a barb (170*a*, 170*b*) extending from the second end (168*a*, 168*b*) of the current bars (162*a*, 162*b*). As explained in further detail below, the barbs (170*a*, 170*b*) in combination with the push-in clamps (156*a*, 156*b*) non-removably secure a cable to the bus assembly 150. As best shown in FIG. 7, in some embodiments, support brackets (172*a*, 172*b*) extend between outer edges of the barbs (170*a*, 170*b*) and the second end (168*a*, 168*b*) of the current bars (162*a*, 162*b*).

As best shown in FIGS. 6 and 7, the fuse contacts (160*a*, 160*b*) are U-shaped, with cantilevered prongs (164*a*, 164*b*) extending from the current bars (162*a*, 162*b*). The cantilevered prongs (164*a*, 164*b*) are configured to elastically deform create an interference fit with the end contacts of the fuse 102, creating an electrical connection. Because the cantilevered prongs (164*a*, 164*b*) are made from highly conductive materials such as copper and aluminum, in some embodiments, the fuse contacts (160*a*, 160*b*) further include reinforcing members 158 that apply a biasing force against the cantilevered prongs (164*a*, 164*b*) of the fuse contacts (160*a*, 160*b*). Thus, the reinforcing members 158 in combination with the cantilevered prongs (164*a*, 164*b*) of the fuse contacts (160*a*, 160*b*) create an interference fit with the end contacts of the fuse 102.

As best shown in FIGS. 6 and 8, the push-in clamps (156*a*, 156*b*) are supported by the clamp support protrusion (146*a*, 146*b*) and the clamp support wall (148*a*, 148*b*). In some embodiments, the push-in clamps (156*a*, 156*b*) are supported by the clamp support protrusion (146*a*, 146*b*). In some embodiments, the push-in clamps (156*a*, 156*b*) include a first end (180*a*, 180*b*) supported by the compartment walls (134*a*, 134*b*). The push-in clamps (156*a*, 156*b*) are normally biased against the barbs (170*a*, 170*b*) of the current bars (162*a*, 162*b*). Insertion of an electrical cable (139) into the cable termination apertures (138*a*, 138*b*) depresses and elastically deforms the push-in clamp (156*a*, 156*b*) such that a gap is formed between the barb (170*a*, 170*b*) and the push-in clamp (156*a*, 156*b*). The electrical cable (139) advances between the push-in clamp (156*a*, 156*b*) and the barb (170*a*, 170*b*) while the push-in clamp (156*a*, 156*b*) continuously applies a biasing force against the electrical cable (139). The electrical cable (139) can be inserted until the electrical cable (139) abuts the current bar (162*a*, 162*b*). Withdrawing of the electrical cable (139) from the cable termination apertures (138*a*, 138*b*) causes the barb (170*a*, 170*b*) to catch the electrical cable (139) due to the biasing force applied by the push-in clamp (156*a*, 156*b*) against the electrical cable. Thus, the electrical cable (139) is non-removably clamped into the termination apertures (138*a*, 138*b*).

In some embodiments, to release the electrical cable (139) from the cable termination apertures (138*a*, 138*b*), a tool such as a flathead screwdriver, can be inserted into the lock pin slots (140*a*, 140*b*). The tool depresses the push-in clamp (156*a*, 156*b*) such that the push-in clamp (156*a*, 156*b*) no longer biases the electrical cable (139), and the electrical cable (139) can be removed from the termination apertures (138*a*, 138*b*).

In some embodiments, to release the electrical cable (139) from the cable termination apertures (138*a*, 138*b*), a lock pin 152 can be positioned within the lock pin slots (140*a*, 140*b*). The lock pin 152 normally abuts the push-in clamp. Depression of the lock pin 152 depresses the push-in clamp (156*a*, 156*b*) such that the push-in clamp (156*a*, 156*b*) no longer biases the electrical cable (139), and the electrical cable (139)_can be removed from the termination apertures (138*a*, 138*b*). In some embodiments, the lock pin 152 is flush with the sidewall 112 of the housing 110 and can be depressed by a tool. In some embodiments, the lock pin 152 protrudes from the sidewall 112 such that the lock pin 152 can be depressed by a hand of a user.

Other variations to the disclosed embodiments can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

While the disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the disclosure refer to an embodiment of the disclosure and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuse holder comprising:

a housing including sidewalls and compartment walls defining a fuse compartment and termination compartments, each termination compartment having a cable termination aperture for receiving an electrical cable and a lock pin slot, the fuse compartment configured to receive a fuse;

a bus assembly disposed in the housing, the bus assembly including current bars having a first end and a second end extending from the fuse compartment to the termination compartment, the first end having fuse contacts extending from the first end, the second end including a barb extending from the second end;

push-in clamps disposed within the termination compartment, the push-in clamps normally biased against the barbs, each of the push-in clamps configured to elastically deform, upon insertion of the electrical cable into the cable termination aperture, to form a gap between the barb and the push-in clamp, each of the push-in clamps being further configured to continuously apply a biasing force, during and after insertion of the electrical cable, against the electrical cable clamping the electrical cable into the termination aperture; and a fuse lever for holding the fuse, wherein the fuse lever includes a slot for receiving the fuse and the fuse lever includes a snap-fit cap for securing the fuse within the slot, wherein the snap-fit cap removably secures to the fuse lever, the fuse lever is pivotable about a pin disposed within the fuse compartment of the housing and is pivotable between an open position and closed position, wherein the fuse contacts of the bus assembly contact the fuse.

2. The fuse holder of claim 1, wherein withdrawing of the electrical cable from the cable termination apertures causes the barbs to catch the electrical cable due to the biasing force applied by the push-in clamps against the electrical cable.

3. The fuse holder of claim 2, wherein a tool is inserted into the cable termination apertures to release the cable, the tool depressing the push-in clamps such that the push-in clamps no longer bias the electrical cable.

4. The fuse holder of claim 2 further comprising lock pins positioned within each lock pin slot, the lock pins normally abutting the push-in clamps, wherein the lock pin slots are positioned adjacent to the cable termination apertures.

5. The fuse holder of claim 4, wherein depression of the lock pins depresses the push-in clamps such that the push-in clamps no longer biases the electrical cable.

6. The fuse holder of claim 4, wherein the lock pins are flush with a sidewall of the housing in which each lock pin slot is defined, and wherein the lock pins are configured to be depressed by a tool.

7. The fuse holder of claim 4, wherein the lock pins protrude from a sidewall in which each lock pin slot is defined, such that the lock pin is configured to be depressed by a user.

8. The fuse holder of claim 1, wherein the termination compartments are configured to enable insertion of the electrical cable to abut the current bar.

9. The fuse holder of claim 1, wherein the fuse lever can pivot 70 degrees about the pin between the open position and the closed position.

10. The fuse holder of claim 1, wherein the fuse lever further includes an end-stop opposite the snap-fit cap which limits an insertion distance the fuse can be inserted into the slot.

11. The fuse holder of claim 1, wherein the end-stop further includes a ledge extending a distance from the end-stop, the distance sized and configured to fit with UL Class CC fuses.

12. The fuse holder of claim 1, wherein the fuse compartment is defined by compartment walls, and the termination compartment is defined by the compartment walls and the sidewalls of the housing.

13. The fuse holder of claim 12, wherein the termination compartments include a channel defined by an opening in the compartment walls, the current bars positioned within the channel.

14. The fuse holder of claim 1, wherein each termination compartment includes a clamp support protrusion configured to secure the push-in clamp of each termination compartment.

15. The fuse holder of claim 1, wherein the fuse contacts are U-shaped cantilevered prongs extending from the current bars, the cantilevered prongs configured to elastically deform to create an interference fit with end contacts of the fuse creating an electrical connection.

16. The fuse holder of claim 15 further comprising a reinforcing member that applies a biasing force against the cantilevered prongs of the fuse contacts.

17. A fuse holder comprising:

a housing including sidewalls and compartment walls defining a fuse compartment and termination compartments, each termination compartment having a cable termination aperture for receiving an electrical cable and a lock pin slot, the fuse compartment configured to receive a fuse;

a bus assembly disposed including current bars having a first end and a second end extending from the fuse compartment to the termination compartment, the first end having fuse contacts extending from the first end, the second end including a barb extending from the second end;

push-in clamps disposed within the termination compartment, the push-in clamps normally biased against the barbs, each of the push-in clamps configured to elastically deform, upon insertion of the electrical cable into the cable termination aperture, to form a gap between the barb and the push-in clamp, each of the push-in clamps being further configured to continuously apply a biasing force, during and after insertion of the electrical cable, against the electrical cable clamping the cable into the termination aperture, wherein withdrawing of the electrical cable from the cable termination apertures causes the barbs to catch the electrical cable due to the biasing force applied by the push-in clamps against the electrical cable;

lock pins positioned within the lock pin slots, the lock pins normally abutting the push-in clamps, wherein the lock pin slots are positioned adjacent to the cable termination apertures, wherein depression of the lock pins depresses the push-in clamps such that the push-in clamps no longer biases the electrical cable; and a fuse lever for holding the fuse, wherein the fuse lever includes a slot for receiving the fuse and the fuse lever includes a snap-fit cap for securing the fuse within the slot, wherein the snap-fit cap removably secures to the fuse lever, the fuse lever is pivotable about a pin disposed within the fuse compartment of the housing and is pivotable between an open position and closed position, wherein the fuse contacts the fuse contacts of the bus assembly.

* * * * *